Feb. 17, 1953  S. H. SWARTHOUT  2,629,061
ELECTRIC MOTOR
Filed April 15, 1949  2 SHEETS—SHEET 1

INVENTOR
STANLEY H. SWARTHOUT
BY
Spencer, Hardman + Fehr
HIS ATTORNEYS

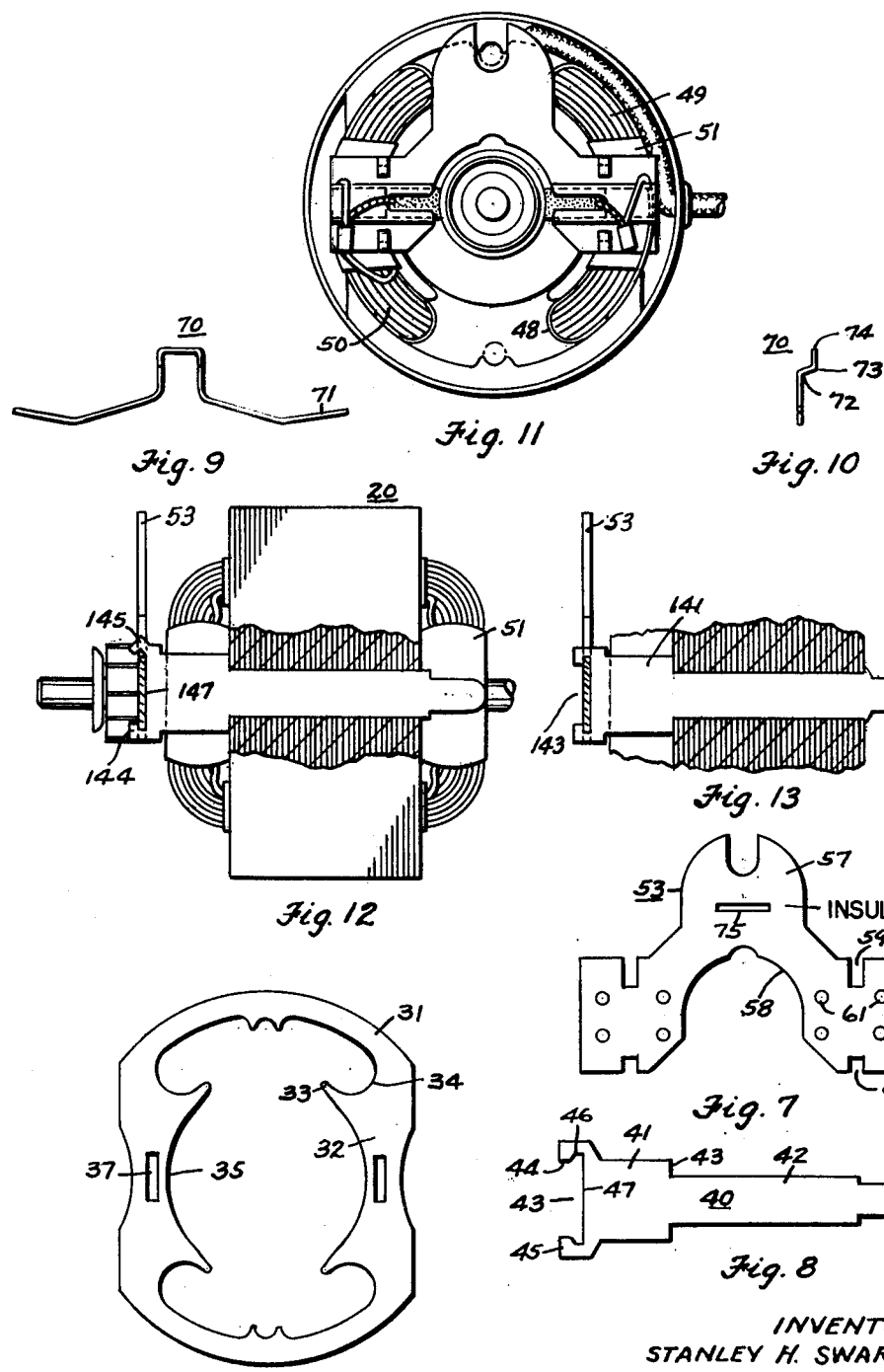

Patented Feb. 17, 1953

2,629,061

UNITED STATES PATENT OFFICE 2,629,061

ELECTRIC MOTOR

Stanley H. Swarthout, Rochester, N. Y., assignor to General Motors Corporation, Detroit, Mich., a corporation of Delaware Application April 15, 1949, Serial No. 87,624

11 Claims. (Cl. 310—42)

The present invention relates to improvements in the manufacture and assembly of small fractional horse power motors and has for an object to provide a structure at minimum cost and simplicity which leads to inexpensive manufacture and assembly.

The features of the invention for accomplishing the foregoing object include a pair of flat supports or retaining devices of sheet metal having tongues or extensions adjacent abutments that receive a plurality of laminations so formed that parts of the tongues or extensions may be staked, upset or otherwise deformed which will securely retain the laminations under compression and in their proper assembled relation. The extending ends of the supports are likewise fashioned preferably by cooperating notches such as to support a brush holding plate which is retained in assembled relation by properly stressed spring members lockably received in notches at the ends of the supports. Mounted on the brush holding plate are brush guides or tubes having provisions for anchoring the terminal ends of field windings and coincidently retaining the brush urging springs in place in cooperable relation with the usual commutator.

Further objects and advantages of the present invention will be apparent from the following description, reference being had to the accompanying drawings wherein a preferred embodiment of the present invention is clearly shown.

In the drawings:

Fig. 6 is a plan view of a lamination used in the formation of the core.

Fig. 7 is a plan view of a brush guide supporting plate as illustrated in Fig. 3.

Fig. 8 is a side plan view of a flat support illustrated in Fig. 4.

Fig. 9 is a plan view of a spring member illustrated in Fig. 3.

Fig. 10 is a side view of the spring shown in Fig. 9.

Fig. 11 is an end view of a stator core showing a modified form of a brush mounting plate provided with another construction of a securing device for retaining the plate on the stator core.

Fig. 12 is a side view of the stator core, partly in section illustrating the method of mounting the lamination on the securing device and also the method of mounting the brush supporting plate on the securing device.

Fig. 13 is a partial sectional view, of the construction shown in Fig. 6 illustrating the method of securing the brush mounting plate to the securing device and also the method of retaining the lamination on the securing device.

Figure 2:
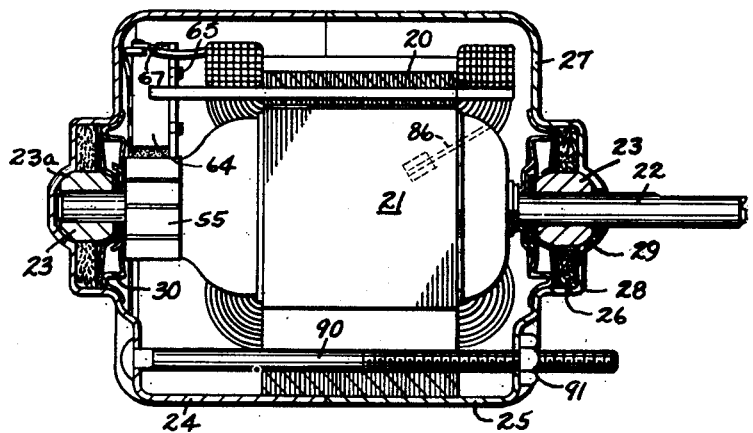
Fig. 2 is a sectional view taken on line 2—2 of Fig. 1.
Figure 1:
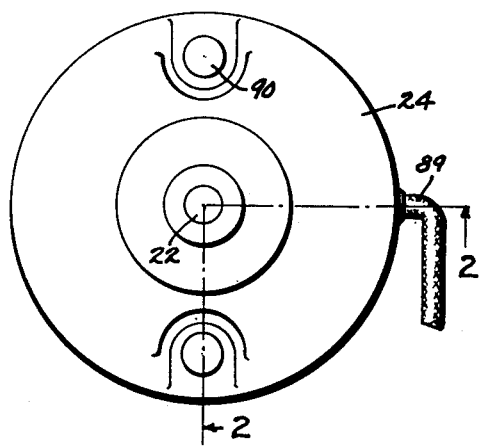
Fig. 1 is a front end elevational view of a motor embodying the features of the present invention.
Figure 3:
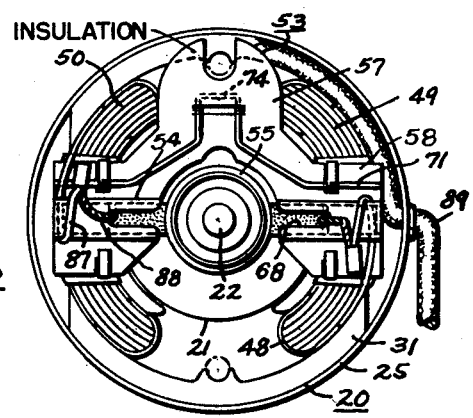
Fig. 3 is an end elevational view, with cup members removed, showing the brush mountings supported on stator of the motor.

Referring to Fig. 2, the present invention is shown as being applied to a motor having a stator core assembly 20 and a rotor assembly 21 including a shaft 22 which is mounted in self-aligning bearings 23 carried by two cup-shaped housings 24 and 25. Each housing has a substantially cylindrical side wall and a substantially flat end wall 27. Sockets 28 are provided in each end wall and each socket has a spherical seat 29 to receive a self-aligning bearing 23 having spherical outer surface 23a. A felt washer 26, saturated with lubricant, surrounds each bearing. The washers 26 are held within the sockets and the bearings against their sets by spring retainer devices 30.

The stator core 20 for the motor, composed of a suitable number of magnetic laminations 31, is clearly shown in Fig. 6. The central portion of each lamination is cut out to form complementary and oppositely deposed pole pieces 32 having ears or tips 33 formed by recesses 34 and arcuate end surfaces 35 within which the rotor 21 is rotatably mounted. The stack of laminations which form the core are provided with a pair of diametrically opposite rectangular openings 37, each opening being located between one of the pole pieces 32 and the periphery of the laminations. The stack of laminations is held together by a pair of brush plate support or retaining devices 40.

One type of support or retainer device 40, is shown in Fig. 8. This support comprises a stamping of flat sheet metal having an enlarged portion 41 and a reduced portion or tongue 42 to form abutments or shoulders 43. The enlarged portion of each support has a C-shaped slot or notch 43 at the outer end thereof. The slot 43 is restricted at 44 by tapered claws or fingers 45, adjacent the open end of the slot, a straight horizontal surface 46, and a straight bottom or seat 47.

Figure 4:
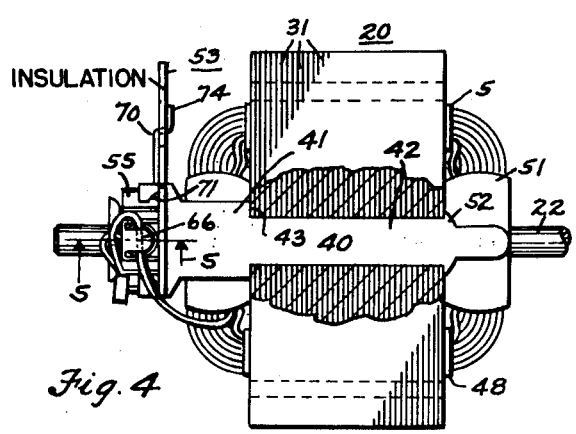
Fig. 4 is a side view of the stator core and the brush mounting; the stator core being partly in section illustrating the constructional detail of the securing device used in present invention.

Before the stator laminations 31, are secured, the laminations are first weighed out and aligned and held under pressure in a fixture, not shown. While the laminations are held under the adequate pressure, channel shaped insulating strips 48 are assembled under the ears 33 of the pole pieces and then one field coil 49 is assembled on one pole piece and then formed to shape, and this is followed by a second field coil 50. The open ends of the channel shaped insulating strips are folded over around the coils and held together by suitably spaced pieces of tape 51. Then the tongues 42 of brush plate supports 40 are inserted from the front in respective rectangular openings 37 in the laminations and then staked, as at 52, over the rear lamination of the core 40, see Fig. 4, thus securely retaining the laminations under compression between the shoulders 43 and the staked portions 52.

A plate member 53 is arranged to support and position at least two brush holders 54 about the circumferential surface of a commutator 55 of the armature of rotor 21. The brush holder plate is formed preferably of a sheet insulating material. The thickness of the plate is slightly less than the width of the straight portion 46 of the recess 43. The central portion 57 of the plate 53 has an arcuate notch 58 on one side to provide clearance about the commutator 55 of the armature or rotor when the plate member is assembled in operative position. The plate 53 has outwardly extending arms 58 arranged in parallelism at opposite sides of the central portion 57. Each arm 58 has a pair of spaced notches 59 and 60 formed on each of two opposite sides thereof with the sides of the notches extending toward each other. The notch 59 is deeper than the notch 60. Two sets of paired apertures 61 are punched in each arm 58 of the plate 57.

A metal brush guide or holder 54 is mounted on each arm 58 of the plate for slidably supporting a carbon brush 56 adapted to make contact engagement with the commutator 55. The holders are diametrically opposite each other to permit transfer thereto of current from an external supply as is well known in the art. Each brush holder 54 comprises a U-shaped member having a yoke or bite 63 and arms 64. Each arm is formed with a pair of lugs 65 which project through the openings 61 and bent over into clamping engagement with the inside of the arms 58 so as to retain the brush holder in position upon the arms. The outer end of the yoke 63 has an ear 66 and the outer ends of the arms 64 have notches 67. The inner end of the yoke is provided with a slot 68, and the purposes of which will be described hereinafter.

After the brush holders 54 are attached to the arms 58 the plate 53 is assembled to the supports 40. This is accomplished by inserting the lower end of the arms 58 into the notch 43 so that the sides of notches 60 will straddle the lower portion of the marginal walls of the recess 43 and when the bottom of the notches 60 rest on the lower surfaces 46 the plate is pushed inwardly with the sides of the notches 59 receiving the upper portion of the portion 41. When those portions of the arms 58 between the notches 59, 60 abut the seats 47 the plate is held in assembled relation to the supports 40 by a spring wire member 70. This spring member 70, see Figs. 9 and 10, comprises a length of stiff wire deformed to provide a substantially U-shaped main section having legs which terminate into outward wings 71. The upper end of the U-portion is bent at 72 out of the normal plane of the length of wire and then bent again at 73 in a plane that is in parallelism with the normal plane of the wire to form a hook portion 74. In assembling the spring member 70 so as to secure the plate 53 to the supports 40 the hook portion 74 is inserted through an opening 75 in the central portion 57 and this hook portion engages the inside of the plate above the opening 75. Then the arms 71 are stressed downwardly and are inserted in the restricted part of the openings 43 and placed behind the tapered or inclined portions of the fingers 44. When the force applied to the arms is released, the wings will tend to approach their normal state and in doing so the inclined surface will cam the wings inwardly which in turn will force the arms 58 of the plate firmly against the seats 47 and thus secure the plate against movement in any direction. The upper space between the inclined surface and the outer face of the arms is less than the diameter of the wire, therefore the wings cannot return to their normal state, thus the arms are always urged against the seats 47 while the plate 57 is in assembled relation with the supports 40.

Figure 5:
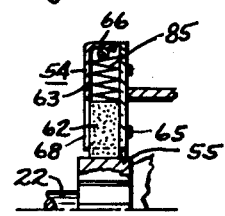
Fig. 5 is a sectional view taken on line 5—5 of Fig. 4.

After the plate 57 is assembled with the supports 40 an end of a terminal lead of each coil is bent so that it will lie in the notches 67 in the arms 64 of the brush guides. Then the free end is bent so that it will be located adjacent the yoke 63 and extend beyond the yoke. Then the ear 66, see Fig. 5, is bent inwardly and over the terminal lead to hold same within the notches 67 and into good electrical contact with the holders 54. A spring 85 and a brush 62 are both inserted in each holder 54. The portion of the wire which extends across the space between the arms of the brush holder is engaged by the spring and serves as a stop or abutment for the spring 85.

Before the armature is inserted in the stator one terminal lead 86 at one end of the coil 50 is connected to the stator 20, see Fig. 2. This is accomplished by squeezing a steel sleeve flat about the lead 86, then sufficient current is applied to the flattened portion of the sleeve to fuse the copper wire thereto but not melt the steel. The connection of lead 86 to the stator core is indicated in dotted lines, Fig. 2. The next step is to connect the other terminal lead 87 of coil 50 to the brush 62. This is accomplished by inserting the free end of lead 87 and the free end of a pigtail wire 88 attached to each brush in a steel sleeve after which one end of the sleeve is flattened into engagement with the ends of the coil and pigtail. Welding current is applied to the sleeve making a permanent electrical connection between the wires 87, 88 and the sleeve. The manner of welding one free end of the coil 49 with the pigtail of the brush in the other holder is the same as that disclosed for coil 50. The next step is to assemble the armature within the stator core. The springs 85 and brushes 62 in their respective brush holders are held in place by a clip, not shown, to permit easy assembly of the armature within the stator. The armature and stator are then placed in a fixture and the clips are removed, causing the spring 85 to urge their respective brushes into contact engagement with the commutator. While the armature and the stator are in the fixture the other end 89 of the coil 49 is threaded through an opening in the cup 25 after which the case cover is press fitted over field lamination and then spot welded in at least two places one of which is indicated by a heavy line in Fig. 2. The other case 24 is then slipped over the commutator and the same is held in place by inserting the bolts 90 in suitable openings in the casing member and secured by nuts 91.

In Figs. 11, 12 and 13 a modification of supporting member or straps 140 is shown. In this instance an enlarged portion 141 of the strap has an opening or recess 143 that opens toward the end thereof to provide claws 144 and 145. The normal position of the finger 145 is at an angle so as to permit easy passage of the plate into the slots. When the plate is inserted in the notch so that the inside of the plate engages the seat 147 the finger 145 will extend through the notch and the lower claw 146 will overlie the plate and the upper claws 145 will extend above the bottom of the upper notch. The claw 145 is bent downwardly to overlie the brush plate support below the bottom of the upper notch thus urging the plate against the seat 147 and at the same time securing the plate against movement in any direction with respect to the supports.

While the embodiments of the present invention as herein disclosed, constitute a preferred form, it is to be understood that other forms might be adopted.

What is claimed is as follows:

1. In an electric motor; a stack of laminations with a plurality of openings therein, straps of sheet metal having tongues adjacent shoulders, said tongues extending through the openings and being deformed for clamping the laminations against the shoulders, a winding carried by the stack; an armature rotatable in the stack and having a commutator; a plate of insulating material secured to the straps adjacent the commutator; a brush guide fixed to the plate; a brush movable within the guide; a spring within the guide for urging the brush in engagement with the commutator; and means including portions of the guides for anchoring one end of the windings in electrical engagement with the respective guides and springs and thereby retain the spring and brush within the guide.

2. In an electric motor; a stack of laminations provided with openings; straps of sheet metal having tongues adjacent shoulders said tongues extending through the opening and each tongue deformable at its end to clamp the laminations against the shoulders; a winding carried by the stack; an armature rotatable in the stack and having a commutator; a brush support plate of insulating material secured to the straps adjacent to the commutator; brush guides fixed to the plate; a brush including a flexible lead slidably supported in each guide; a spring within each guide for urging the brush in engagement with the commutator; means including portions of guides for anchoring one end of the winding to the guide and also for retaining the spring and brush within the guide; and means for electrically connecting the lead to the end of the winding.

3. In an electric motor, the combination with a stack of laminations having an opening for the reception of an armature having a commutator; of longitudinally flat metallic strips having an enlarged portion formed with a recess on its end and having reduced portions to provide shoulders, said reduced portions extending through apertures extending through the stack parallel to the axis of the opening and projecting beyond one end face of the stack, each projecting end being deformed over said face to clamp the stack against the shoulders on said strips; a plate of insulating material supporting spaced, metallic guides for brushes adapted to engage the commutator, said plate having arms inserted in the recesses of the strips; and means for locking the arms in said recesses whereby the plate is supported by said straps and in a position in which the guides are located on diametrically opposite sides of the commutator.

4. In an electric motor, a stack of laminations with openings therein; windings carried by said laminations; a plurality of retaining devices, each having a shank adjacent shoulders extending through the openings of the laminations and each having deformable portions at the end of the shanks for clamping the laminations against the shoulder; an armature rotatable in the stack and having a commutator; a plate of insulating material supported on the retaining devices adjacent the commutator; brush guides fixed to the plate; a spring and a brush having a flexible lead slidable in each guide, each spring urging its brush in engagement with the commutator; means including a portion of each guide for anchoring a lead of each winding crosswise to one guide and so that the spring thereon is in engagement with the lead to prevent outward displacement of the spring and brush, the end of the lead extending beyond the anchoring means; and means for electrically connecting said flexible lead.

5. In an electric motor, a stack of laminations having a bore for the reception of an armature; a pair of flat sheet metal supports each having a recess at one end to provide fingers and having a reduced portion at another end to provide shoulders, said reduced portions extending through openings provided by the laminations; means including portions of the reduced portions engaging the stack for clamping the same against the shoulders on said supports; a brush supporting fixture detachably secured to the supports, said fixture including a plate of insulating material having arms extending in opposite directions and each arm projecting through one of the recesses behind the fingers; and a removable U-shaped spring member mounted on the plate, said spring member being deformed in a manner so that the yoke will engage the rear side of plate and having wings on the extremities of its legs engaging the front side of the plate, each wing cooperating with a finger of each support for holding the plate against shifting relative to the supports.

6. In an electric motor the combination with a stator lamination stack having a bore for the reception of an armature having a commutator; of steel strips supporting the stack and having extensions provided with a recess at one end adjacent the commutators, said recess being formed to provide spaced tapered fingers extending toward each other and a seat; a plate of insulating material having an intermediate portion provided with an opening to straddle the commutator and having arm portions at the opposite side of the intermediate portions, said arms having notches formed in each of two opposite sides thereof; a brush holder carried by each arm portion; means including portions of the metal strips received by the notches of the arms to prevent sidewise movements of the plate; and a detachable spring member mounted on the plate, said member having a hook portion extending through the opening in the intermediate portion and engaging the rear side of the plate and having opposite extending legs on the front side of the plate and cooperating with the tapered fingers of the strips to cam the arms against the seat of the recesses in the strips and thereby hold the plate against movement in any direction relative to the strips.

7. In an electric motor, the combination with a stator lamination stack having a bore for the reception of an armature having a commutator, of windings carried by the stack; spaced steel strips for supporting the stack on one end thereof and having the other ends projecting beyond the stack adjacent the commutator; a plate of insulating material detachably attached to the strips adjacent the commutator; brush guides adapted slidably to receive biased brushes, said guides being attached to the plate; and means including portions of the guides for anchoring a terminal lead of the windings in electrical engagement with the guides, said means also acting as a stop to prevent displacement of a biased brush in one direction.

8. In an electric motor the combination with a stator lamination stack, of spaced longitudinally steel strips having a reduced portion to provide shoulders, said reduced portions mounted in openings extending through the stator lamination stack parallel to the axis of said opening; means for clamping the laminations against the shoulders on said strips, an armature rotatable in the stack and having a commutator beyond one face of the stack, a brush supporting fixture carried by the steel strips adjacent the commutator, said fixture comprising a plate of insulating material having opposed arms projecting through recesses in the strips each arm having notches for receiving portions of the strips to prevent transverse movement of the plate relative to the strips, brush guides carried by the arms; biased brushes located within the guides for engagement with the commutator; and means for detachably holding the arms within the recesses of the strips and thereby holding the plate against longitudinal movement relative to the strips.

9. In an electric motor, the combination of a stack of laminations including spaced supporting means for holding the stack in a state of compression, said supporting means including an enlarged portion having a recess opening to one end to provide opposed fingers and a reduced portion to provide shoulders, said reduced portions extending through openings provided by the stack and deformed against the stack to clamp the stack against the shoulders and hold same in a state of compression; an armature having a commutator rotatable within the stack with the commutator adjacent the enlarged portion of the supporting means; a detachable brush rigging fixture including an insulating plate having opposite extending arms each of which support a metallic guide for slidably supporting a biased brush for engagement with the commutator, said arms having their end projecting through respective recesses of the supporting means behind the fingers; and means for clamping the arms of the plate within their respective recesses whereby the plate is prevented from moving in any direction relative to the supporting means.

10. A stator and brush holder assembly for use in an electric motor, the combination comprising a laminated stack wherein each lamination has at least two slots therethrough aligned with corresponding slots in the next adjacent lamination; metallic strips having an enlarged portion formed with a recess at one end and having reduced portions to provide shoulders, said reduced portions adapted to pass through the slots and to be deformed for clamping the laminations against the shoulders on the strips in tight permanent assembled relation, an insulated plate having arms inserted in said recesses of the strips, means including portions of the strips for retaining the arms of the plate within the recess; and brush holders carried by said plate.

11. In an electric motor, a laminated stator stack comprising a plurality of laminations, each lamination having slots therethrough aligned with corresponding slots in the next adjacent lamination, anchoring strips having reduced portions to provide shoulders, said reduced portions being constructed and arranged to pass through the slots and to be deformed for clamping the laminations against the shoulders on the strips in tight, permanent assembled relation, a winding carried by the stator stack, an armature rotatable in the stack, said armature having a commutator, and a brush holder operatively connected to and supported by said strips adjacent the commutator.

STANLEY H. SWARTHOUT.

REFERENCES CITED

The following references are of record in the file of this patent:

UNITED STATES PATENTS

| Number | Name | Date |
| --- | --- | --- |
| 481,701 | Lundell | Aug. 30, 1892 |
| 588,602 | Rice | Aug. 24, 1897 |
| 851,793 | Barker | Apr. 30, 1907 |
| 928,771 | Kunkel | July 20, 1909 |
| 1,227,571 | Blumberg | May 29, 1917 |
| 1,293,973 | Strohacker | Feb. 11, 1919 |
| 1,738,171 | Critchfield | Dec. 3, 1929 |
| 2,176,118 | Brinda | Oct. 17, 1939 |
| 2,482,921 | Malchus | Sept. 27, 1949 |